United States Patent
Hedberg (10) Patent No.: US 6,665,351 B2
(45) Date of Patent: Dec. 16, 2003

(54) CIRCUIT AND METHOD FOR PROVIDING A DIGITAL DATA SIGNAL WITH PRE-DISTORTION

(75) Inventor: Mats Hedberg, Kvickrotsv (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 360 days.

(21) Appl. No.: 09/770,406

(22) Filed: Jan. 29, 2001

(65) Prior Publication Data
US 2001/0010712 A1 Aug. 2, 2001

(30) Foreign Application Priority Data

Feb. 2, 2000 (EP) ............................................. 00101675

(51) Int. Cl.⁷ ............................................. H04L 25/03
(52) U.S. Cl. ....................................................... 375/296
(58) Field of Search ................................. 375/295, 296, 375/285, 257; 455/63, 43; 332/107, 123

(56) References Cited

U.S. PATENT DOCUMENTS

| 4,584,690 | A | | 4/1986 | Cafiero et al. |
|---|---|---|---|---|
| 5,963,090 | A | * | 10/1999 | Fukuchi ........................ 330/149 |
| 6,141,377 | A | * | 10/2000 | Sharper et al. ............... 375/222 |
| 6,292,014 | B1 | * | 9/2001 | Hedberg ....................... 326/30 |

FOREIGN PATENT DOCUMENTS

| DE | 43 08 418 A1 | | 9/1994 | |
|---|---|---|---|---|
| DE | 198 25 258 A1 | | 12/1999 | |
| EP | 0 669 738 A2 | | 8/1995 | |
| EP | 0 729 231 A2 | | 8/1996 | |
| EP | 0 907 276 A1 | | 4/1999 | |
| EP | 1122921 A1 | * | 8/2001 | ........... H04L/25/49 |
| WO | 85/05234 | * | 11/1985 | |
| WO | 98/33292 | | 7/1998 | |
| WO | 98/37656 | | 8/1998 | |
| WO | 98/38743 | | 9/1998 | |
| WO | 98/39846 | | 9/1998 | |
| WO | 98/56113 | | 12/1998 | |
| WO | 99/04494 | | 1/1999 | |
| WO | 99/37026 | | 7/1999 | |
| WO | 99/48244 | | 9/1999 | |

OTHER PUBLICATIONS

R. Farjad–Rad et al, "A 0.4–$\mu$m CMOS 10–Gb/s 4–PAM Pre–Emphasis Serial Link Transmitter", IEEE Journal of Solid–State Circuits, vol. 34, No. 5, May 1999, pp. 580–585.
"DS90CR483/DS90CR484 48–Bit LVDS Channel Link Serializer/Deserializer", National Semiconductor, DS100918, Sep. 1999, pp. 15–16.

* cited by examiner

Primary Examiner—Tesfaldet Bocure
(74) Attorney, Agent, or Firm—Nixon & Vanderhye, P.C.

(57) ABSTRACT

In accordance with the present invention a digital data signal is given a pre-distortion by means of combining the amplitudes of the digital data signal and of at least one delayed version of the digital data signal. The delayed digital data signal is provided by a delay circuit having an adjustable time delay. A circuit for detecting the duration of a signal pattern in the digital data signal that is indicative of the duration of a repetitively occurring signal segment that determines the delay appropriate in view of the current data rate of the data signal, generates an adjustment signal for adjusting the time delay provided by the adjustable delay circuit. In this way it is possible to add a full bit or partial bit pre-distortion of any desired order to the digital data signal even if the data rate of the digital data signal is unknown at the time of manufacturing the circuit for providing pre-distortion or is allowed to vary, without there being a need for a bit rate synchronous clock.

18 Claims, 5 Drawing Sheets

CIRCUIT AND METHOD FOR PROVIDING A DIGITAL DATA SIGNAL WITH PRE-DISTORTION

BACKGROUND

I. Field of the Invention

The present invention relates to a circuit and a method for providing a digital data signal with pre-distortion for transmission over a medium having frequency dependent transmission characteristics.

II. Related Art and Other Considerations

It is well known that when transmitting a signal over a frequency dependent media like a real transmission line having frequency dependent losses or an optical cable, the signal shape will change in the course of the transmission. A bandwidth limited electrical transmission line for example will cause higher losses to high frequency components of a transmitted signal than to lower frequency components. The effect of the transmission media on the signal is the more pronounced the higher the frequency components of the signal to be transmitted and the longer the transmission length through the media. This effect imposes limits on the maximum transmission length and/or the maximum speed of a signal transmission system having a signal driver at an input side of the transmission media and a receiver for receiving the signals output by the transmission media at the other side.

Modern communication systems use digital signals for carrying information. Generally speaking, a digital signal generally consists of a random sequence of so-called symbols each representing one or more data bits. When a digital signal is transmitted over a frequency dependent media like a transmission line, the transmitted digital signal will suffer from distortion even if there is perfect matching at the receiver side and at the transmitter side because the higher order harmonics in the signal spectrum suffer from higher losses than lower frequency components of the signal spectrum. Shorter pulses in the digital signal at the receiver side will not reach their full amplitude and the slope of the rising and falling edges in the signal seen by the receiver will deteriorate. This effect, also called Inter Symbol Interference (ISI), imposes limits on the data rate that the receiver will be able to detect.

As is well known, it is possible to increase the data rate or the transmission length over a given media by means of pre-distorting the digital signal at the input side of the media. Broadly speaking, the pre-distortion takes into account the distortion effected by the transmission media by means of emphasizing components of the signal to be transmitted that will suffer from loss in the transmission media. As disclosed in DE 198 25 256, a conventional way to provide a digital data signal with pre-distortion is to delay the digital signal by one bit period or a predetermined fraction of the bit period and to combine the amplitudes of the digital signal and of the delayed digital signal. From this document an output buffer circuit is known that is able to provide a digital output signal with pre-distortion by means of determining the output signal level depending not only on the current data bit to be transmitted but also dependent on the history of the output signal. U.S. Pat. No. 4,584,690 discloses minimizing the effect of intersymbol interference by provision of digital pre-compensation in the transmitted signal to maximize the slew rate between consecutive bits. From this document it is known to base the pre-compensation scheme on a knowledge of the bit pattern and the amount of energy contained in a sequence of bits.

As known e.g. from IEEE Journal of Solid State Circuits, Vol. 34 No. 5, May 1999, P. 580 to 585 a so-called full bit pre-distortion combines the amplitudes of the digital data signal with the weighted amplitudes of one or more delayed versions of the digital data signal, each delayed version having a delay of one or more full bit periods relative to the undelayed digital data signal. The number of delayed versions of the digital data signal with different delay that are combined together determine the so called order of pre-distortion. It is not known from this document that partial bit pre-distortion is equally well feasible by means of combining the digital data signal with a delayed version of it, the delay being set to p times the bit period. A typical value for p is 0.5, this being called half bit pre-distortion.

It is to be noted that the term bit in this context does not necessarily mean a unit of information or a data unit. Rather, in the context of pre-distortion this term generally refers to a repetitively at random occurring constant amplitude segment of minimum duration in the digital data signal. In the special case that the digital data signal format is binary providing two symbols represented by two different signal levels, one representing logic "0" and the other level representing logic "1", then a segment of minimum duration has the same duration as a bit period. There exist, however, other well known digital data signal formats wherein a segment of minimum duration has a duration different from the duration of an information bit.

A conventional way to create the delayed digital data signal for combining with the undelayed digital data signal is to use a clock corresponding to the bit rate and clocked latches to delay the digital data signal by a given multiple or fraction of one bit period. This method is advantageous in that it can adapt to varying bit rates, but requires the existence of a bit rate synchronous clock. Another solution that does not require a bit clock signal is to apply a fixed delay to the digital data signal. This solution is simple but does not allow significant variations in the bit rate of the digital data signal.

An object of the present invention to provide a circuit and a method for providing a digital data signal with pre-distortion, the circuit and method allowing for variations of the data rate of the digital signal without there being a need for supplying a bit rate synchronous clock.

SUMMARY

In accordance with the present invention a digital data signal is given a pre-distortion by means of combining the amplitudes of the digital data signal and of at least one delayed version of the digital data signal. The delayed digital data signal is provided by a delay circuit having an adjustable time delay. A circuit for detecting the duration of a signal pattern in the digital data signal that is indicative of the duration of a repetitively occurring signal segment that determines the delay appropriate in view of the current data rate of the data signal, generates an adjustment signal for adjusting the time delay provided by the adjustable delay circuit. In this way it is possible to add a full bit or partial bit pre-distortion of any desired order to the digital data signal even if the data rate of the digital data signal is unknown at the time of manufacturing the circuit for providing pre-distortion or is allowed to vary, without there being a need for a bit rate synchronous clock.

According to a preferred embodiment the detection of the duration of said signal pattern indicative of said minimum signal segment duration is accomplished by means of providing a delay locked loop that locks onto a predefined signal pattern of minimum duration in the digital data signal. The detected signal pattern can be a predefined sequence of symbols. In case the digital data signal format is binary, the signal pattern can be a simple sequence of alternating signal segments, e.g. pulses . . . −V,+V,−V . . . and/or . . . −V,+V,−V . . . or can be a more complex sequence like . . . −V,+V,−V,+V, . . . and/or . . . +V,−V,+V,−V . . . . It is evident that there exists a variety of possibilities for selecting signal patterns that can be used for detecting the minimum duration of signal segments in the digital data signal. Preferably, the detector circuit adjusts the delay of the delay circuit in accordance with the detected minimum signal pattern duration and refrains from adjusting the delay when similar signal patterns of longer duration occur in the digital data signal.

According to another preferred embodiment the detection of the duration of a repetitively occurring signal pattern in the digital data signal is accomplished by means of sampling the digital data signal at a sampling rate not less than the symbol rate, and detecting the minimum duration of signal segments in the digital data signal based on the minimum number of consecutive samples of the same amplitude. The delay adjustment signal is then generated depending on the detected minimum number of samples. Prior to sampling the digital data signal can be fed through a digital divider circuit that performs a frequency division by N, N being a positive integer greater than 1. In this case the sampling rate for the divided signal should be no less than the symbol rate of the digital data signal divided by N. The provision of a divider circuit is advantageous in that it lowers the speed requirements for the detection circuit, this being of particular importance when the data rate to be transmitted by the digital signal is high.

Preferably, the amount of delay of the digital data signal is made dependent on the symbol rate or data rate of the digital data signal such that the delay of the digital data signal expressed as a fraction of a bit period is larger for digital data signals having a high data rate than for data signals at a lower rate. In this way the amount of pre-distortion can even better match the frequency dependent loss characteristics of real world transmission lines over a large range of data rates.

BRIEF DESCRIPTION OF THE DRAWINGS

In the following, preferred embodiments of the present invention will be described with reference to the accompanying drawings.

It is to be noted that throughout the figures similar or identical elements have been denoted with the same reference numerals. The reference numerals denoting signals are furthermore used for the associated lines and terminals carrying, inputting or outputting the respective signals.

DETAILED DESCRIPTION

Figure 1:
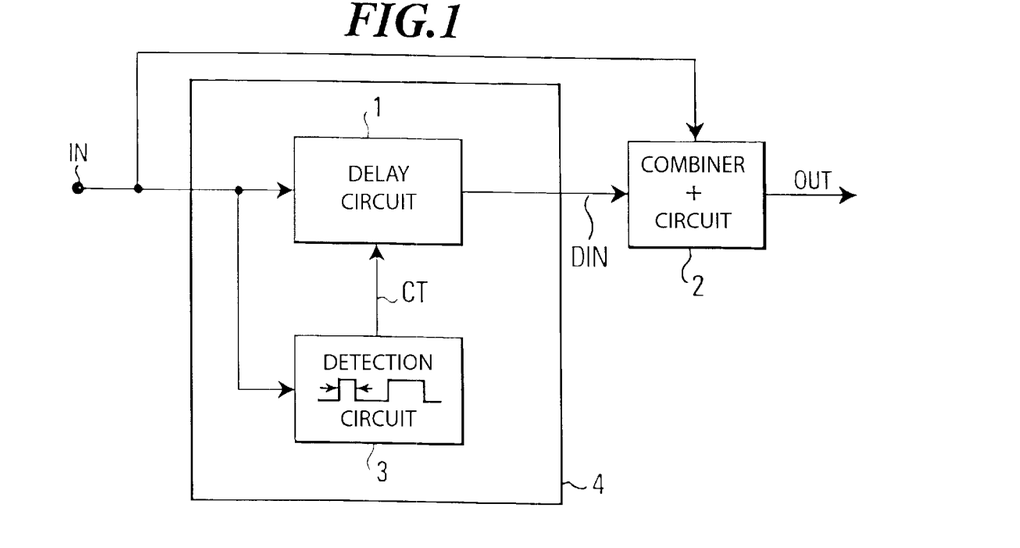
FIG. 1 shows a block diagram of a circuit for providing a digital data signal with pre-distortion in accordance with a first embodiment of the present invention.

FIG. 1 shows a block diagram of a circuit for providing a digital data signal with pre-distortion. In this figure, reference numeral IN denotes an input of the circuit for receiving a digital data signal. Reference numeral 1 denotes a delay circuit for delaying the signal received at the input IN. DIN denotes an output of the delay circuit 1, at which in operation a delayed version of the digital data signal at the input IN is available. The delay of the delay circuit 1 is adjustable in accordance with a control signal at a control input CT of the adjustable delay circuit 1.

Reference numeral 2 denotes a combiner circuit. This circuit receives the delayed digital data signal from the output DIN of the delay circuit 1 and furthermore receives the digital data signal at the input IN. The combiner circuit combines these two signals and generates a digital output signal at an output OUT, the signal at OUT having a pre-distortion for compensating frequency dependent losses in bandwidth limited transmission media. The combiner circuit 2 combines the amplitudes of the signals at terminal IN and at the output DIN of the delay circuit by means of adding the instantaneous amplitude of the signal at IN and the instantaneous amplitude of the signal at DIN to generate the output signal at OUT. Preferably, before combining the signal at IN and the delayed signal at DIN, at least the signal at DIN is subjected to weighting with a factor that determines the so-called pre-distortion ratio (Vpp−Va)/Va, Vpp being the peak-to-peak signal amplitude of the pre-distorted signal at the output OUT of the combiner circuit 2, Va being the peak-to-peak signal amplitude of the output signal at OUT not taking into account the pre-distortion component.

Reference numeral 3 denotes a detection circuit for detecting the duration of a repetitively occurring signal pattern indicative of a minimum signal segment duration in the digital data signal at the input IN. The detection circuit 3 generates a control signal CT depending on the detected shortest signal pattern duration. The adjustable delay circuit 1 and the detection circuit 3 for controlling the delay of the adjustable delay circuit 1 constitute an adaptive delay circuit 4. This adaptive delay circuit 4 can detect the duration of a repetitively occurring signal pattern indicative of a minimum signal segment duration in the digital data at the input IN and delay that signal in accordance with the detected signal pattern duration by an adjustable delay such that a combination of the digital data signal at the input IN and the delayed digital data signal at the output DIN of the adaptive delay circuit 4 results in a digital data signal having an appropriate pre-distortion. Since the adaptive delay circuit 4 is able to adapt the delay to the bit period T or pre-determined fractions of the bit period of the data signal, the circuit shown in FIG. 1 is not limited to specific bit rates. Rather, a circuit according to FIG. 1 can provide a pre-distortion to digital data signals at a variety of different bit rates.

Figure 2A:
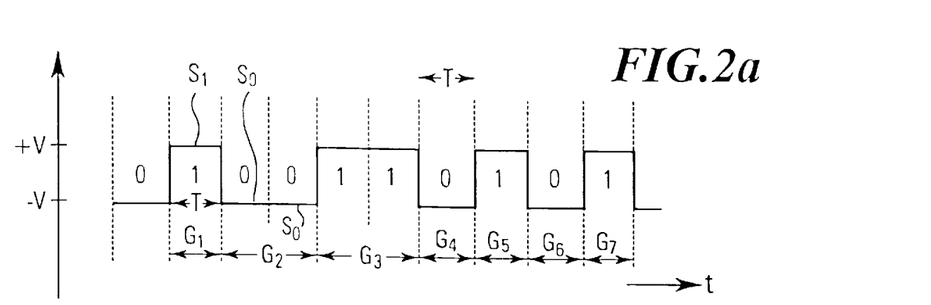
FIGS. 2a to 2c show examples of digital data signals to illustrate different data signal formats.
Figure 2B:
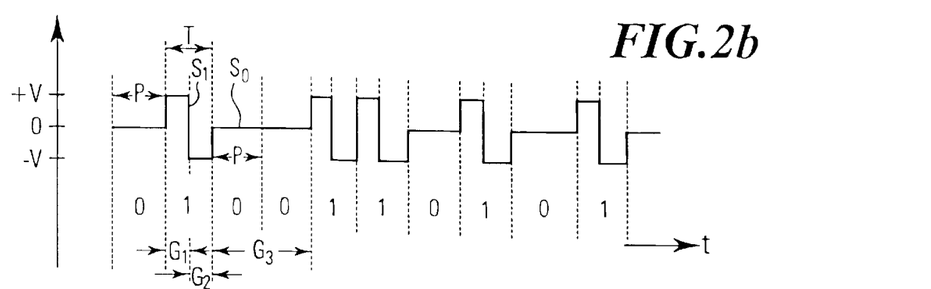
Figure 2C:
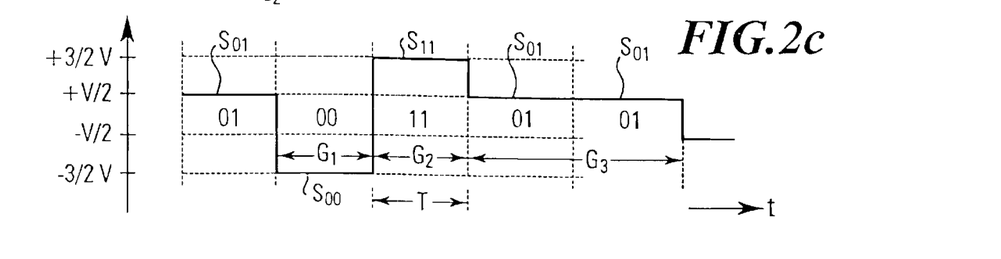

FIGS. 2a to 2c show examples of digital data signals that can be provided with pre-distortion by a circuit shown in FIG. 1. It is to be noted that the signals shown in FIGS. 2a to 2c serve to illustrate the principles of the present invention while the examples in FIGS. 2a to 2c are by no means exhaustive. It will be readily apparent to a person skilled in the art that besides the signal formats in these figures, a large variety of other digital signal formats can be processed in a circuit according to the present invention.

FIG. 2a shows an example of a binary digital data signal. As evident from this Fig. the digital data signal takes one of two signal levels +V and −V in accordance with the binary data to be transmitted. In the example of FIG. 2a, data "0" is represented by signal level −V while data "1" is represented by +V. FIG. 2a shows an arbitrary random sequence of "0" and "1" for exemplifying a stream of digital data. $S_1$ denotes a symbol used for representing data "1" which in the example of FIG. 2a is a constant signal amplitude +V for a predetermined period of time, namely the bit period. Similarly, $S_0$ denotes a symbol representing data "0" by a constant signal amplitude −V that does not change during the bit period. The sequence of symbols $S_0$ and $S_1$ in accordance with the data to be transmitted makes the digital data signal of FIG. 2a. Reference numerals G1, G2, . . . denote signal segments in the digital data signal of FIG. 2a, that is time intervals during which the signal amplitude does not change. It is apparent from FIG. 2a that in the example of the binary digital data signal the duration of a signal segment of constant signal amplitude is an integer multiple of the symbol period which is in turn identical with the bit period.

In order to provide the binary digital data signal of FIG. 2a with pre-distortion, the detection circuit 3 shown in FIG. 1 adjusts the delay T of the delay circuit 1 to a full bit period in case full bit pre-distortion is envisaged, or to a fraction of a bit period in case partial bit pre-distortion is desired. In order to do so the detection circuit 3 aims at detecting the duration of the shortest signal segments, e.g. $G_1$ or $G_4$ in the digital data signal of FIG. 2a. Accordingly, the detection circuit 3 looks for the shortest signal patterns in the form of pulses . . . −V, +V, −V . . . or . . . +V, −V, +V . . . and adjusts the delay in circuit 1 depending on the detected minimum duration of such signal patterns. Of course, the detection circuit 3 can be adapted to detect only the minimum duration of positive pulses or only the minimum duration of negative pulses or it can detect both kinds of pulses and adjust the delay circuit 1 accordingly. Moreover, it is to be noted that for adjusting the delay of delay circuit 1 appropriately to the digital data signal in FIG. 2a the detection circuit can additionally or alternatively detect the minimum duration of more complex signal patterns consisting of a pre-defined sequence of segments like . . . −V,+V,−V,+V . . . or . . . +V,−V,+V,−V . . . . From this it is evident that the only limitation to the choice of possible signal patterns for detecting the minimum signal pattern duration and accordingly controlling the delay is the frequency of occurrence of the particular signal pattern of minimum duration in the digital data signal. The more complex the signal pattern the less frequently does that signal pattern of minimum duration occur.

FIG. 2b shows an example of a digital data signal consisting of a sequence of symbols $S_1$ and $S_0$ for representing data "1" and data "0", respectively. From FIG. 2b it is evident that symbol $S_0$ is a signal segment of signal amplitude zero for the duration of a bit period T while symbol $S_1$ representing data "1" consists of a first signal segment $G_1$ of duration T/2 at signal amplitude +V followed by a signal segment $G_2$ during the second half of the same bit period at signal level −V. The digital data signal of FIG. 2b represents the same data sequence as the data signal of FIG. 2a. This is for the purpose of illustration only. Needless to say that FIG. 2b aims at illustrating another data signal format and the operation of the embodiment of FIG. 1 when processing a random digital data signal having the format shown in FIG. 2b.

For providing a signal of the format illustrated in FIG. 2b with pre-distortion, it is desirable to combine the digital data signal of FIG. 2b with a delayed version of said signal, having a delay of preferably a fraction of a half a bit period P. Again, G1, G2, G3 denote signal segments in the digital data signal of FIG. 2b wherein the signal amplitude remains constant. In this Fig., the minimum signal segment duration corresponds to half a bit period and the segments $G_1$ and $G_2$ denote signal segments of minimum duration. This signal format is particularly advantageous in that it has a strong basic harmonic component that can be detected easily e.g. by means of a phase locked loop. This basic harmonic is one example of a signal pattern that is indicative of the minimum signal segment duration since there is a fixed relationship between this minimum signal segment duration and the period of the basic harmonic component.

FIG. 2c shows a further example of a digital data signal for processing in a circuit according to FIG. 1. Again, for the purpose of illustration only the signal shown in FIG. 2c represents the same sequence of data as in FIGS. 2a and 2b. The signal format of FIG. 2c provides four different symbols $S_{00}$, $S_{01}$, $S_{10}$ and $S_{11}$, each symbol representing two bits.

Each symbol corresponds to a different one of four distinct amplitude levels −(3/2)V to +(3/2)V during a given symbol period. Similar to the preceding figures, reference numerals G1, G2 and G3 denote signal segments wherein the signal amplitude does not change. $G_1$ and $G_2$ exemplify signal segments of minimum duration in the digital data signal.

Figure 3:
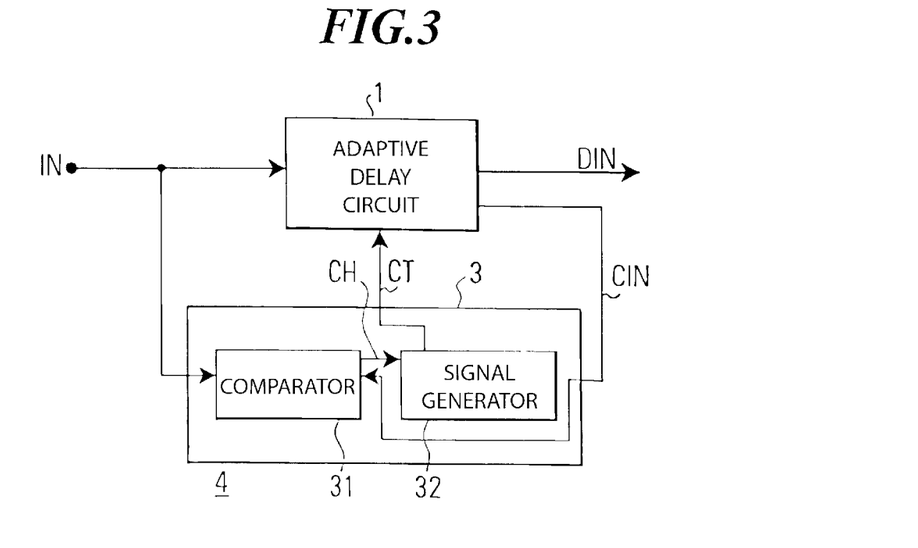
FIG. 3 shows an embodiment of an adaptive delay circuit having a delay locked loop.

FIG. 3 shows an embodiment of the adaptive delay circuit 4, with emphasis on the internal structure of the detection circuit 3. All elements in FIG. 3 that have corresponding or identical elements in FIG. 1, are denoted with the same reference numerals and reference is made to the description of these elements in connection with FIG. 1. The embodiment of FIG. 3 detects the duration of a repetitively occurring signal pattern indicative of a minimum signal segment duration in the digital data signal by means of detecting a timing relationship between said signal pattern at the input IN and a delayed version of said signal pattern at an output CIN of the adjustable delay circuit 1.

In FIG. 3, reference numeral 31 denotes a comparator circuit 31 for detecting such timing relationship and for generating a control signal CH that indicates the timing relationship. Reference numeral 32 denotes a circuit for generating a delay adjusting signal in accordance with the timing relationship detected by comparator circuit 31. Specifically, the comparator circuit 31 detects the occurrence of a specified signal pattern at the input IN and furthermore detects the occurrence of that signal pattern in the delayed version CIN of the digital data signal and indicates by means of the control signal CH whether or not there is an overlap on the time axis between the detected signal pattern at IN and the delayed signal pattern at CIN. Whenever the signal pattern at IN and the delayed signal pattern CIN do not overlap, i.e. whenever the signal pattern at IN is over before the delayed signal pattern at CIN begins, the comparator circuit 31 gives a corresponding indication at its output CH to a circuit 32 for generating a delay adjusting signal. Based on this control signal CH, circuit 32 updates the delay adjusting signal CT to the delay circuit 1 with the objective that the end of the specified signal pattern at the input IN coincides with the beginning of the same signal pattern in the delayed version CIN of the digital data signal. Whenever there is a gap on the time axis between these two versions of said signal pattern, the delay adjusting signal generating circuit 32 decreases the delay of delay circuit 1 such that the delay generated by delay circuit 1 at the output CIN relative to its input IN will eventually correspond to the minimum duration of said signal pattern that repetitively occurs in the digital data signal. The minimum duration of said specified signal pattern in turn has a fixed known relationship to the minimum signal segment duration in the digital data signal.

Reference numeral 1 in FIG. 3 denotes an adjustable delay circuit having an input IN and furthermore having a first output DIN for outputting a delayed version of the signal at the input IN as well as a further output CIN for outputting a delayed version of the input signal IN at a delay that is a predetermined multiple of the time delay at the output DIN. The relationship in the delay at CIN to the delay at DIN depends on how long the minimum duration of the specified signal pattern is, relative to the delay desired at DIN for achieving full bit or partial bit pre-distortion. The outputs CIN and DIN can of course be the same if the delay at the output CIN is the same as the delay at the output DIN.

Figure 4:
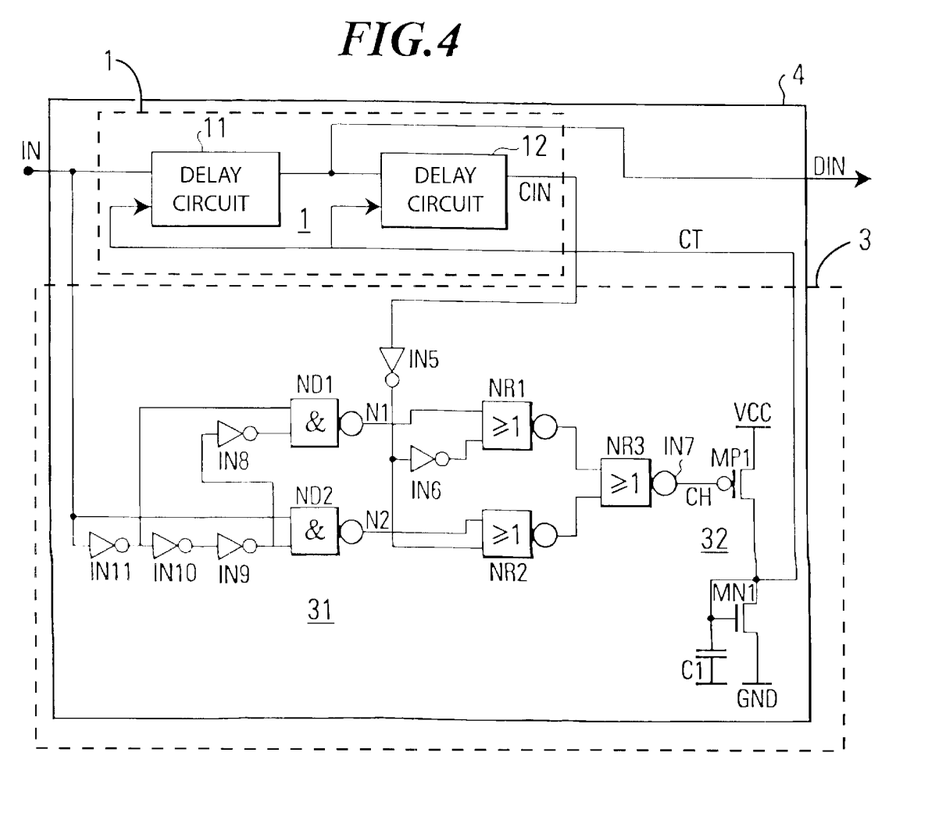
FIG. 4 shows a specific embodiment of an adaptive delay circuit of FIG. 3 for generating half bit pre-distortion.

FIG. 4 shows a specific embodiment of the delay circuit 1 and the detection circuit 3 including the comparator circuit 31 and the delay adjusting signal generating circuit 32 of FIG. 3 for generating first order partial bit pre-distortion. In FIG. 4, reference numerals 11 and 12 respectively denote delay circuits connected in series. The data signal input of delay circuit 11 is connected with the input IN of the adaptive delay circuit 4. The data signal output of delay circuit 11 is connected with the data signal input of delay circuit 12. Each of the delay circuits 11 and 12 receives a delay adjustment signal CT. The data signal output of delay circuit 11 provides a delayed version DIN of the digital data signal at the input IN of the adaptive delay circuit 4, the signal DIN being used for pre-distorting the digital data signal at IN as previously described. The data output of the delay circuit 12 provides a further delayed signal CIN that is used by the comparator circuit 31 for adjusting the delay of each of the delay circuits 11 and 12 such that the total delay generated by the series connection of circuits 11 and 12 corresponds to the bit period of the digital data signal.

The comparator circuit 31 in the embodiment of FIG. 4 has inverters IN1 to IN11, NAND gates ND1, ND2 and NOR gates NR1 to NR3. Circuit 31 receives the digital data signal from the input IN of the adaptive delay circuit as well as the delayed signal CIN from the output of delay circuit 12 and generates a signal CH indicating the timing relationship between a specified signal pattern at the input IN and the delayed version of the signal pattern CIN at the output of the delay circuit 12. In this embodiment, the signal pattern indicative of the minimum signal segment duration in the digital data signal at the input IN is a single pulse of positive polarity, i.e. . . . . −V, +V, −V . . . , or of negative polarity, i.e. . . . +V, −V, +V, . . . . The comparator 31 and the delay adjustment signal generating circuit 32 operate to adjust the delay at CIN of the chain of delay circuits 11 and 12 such that for pulses with minimum duration in the digital data signal, the beginning of the delayed version CIN of the pulse coincides with the end of the undelayed pulse at the input IN. Whenever the comparator circuit 31 detects a gap on the time axis between this signal pattern at the input and the delayed version at the output CIN, the delay provided by the chain of delay circuits 11 and 12 is reduced with the objective to close the gap. Whenever there is no gap between the signal pattern at the input and the delayed version of it, for instance because the pulse is not a minimum duration pulse, the comparator circuit 31 does not generate a signal that would cause the delay adjustment signal generating circuit 32 to reduce the delay generated by circuits 11 and 12 and accordingly, signal patterns with a duration larger than the minimum duration in the digital data signal do not cause an adjustment of the delay. As a consequence, the total delay generated by the circuits 11 and 12 in series will correspond to the duration of pulses that have minimum duration in the sequence of pulses in the digital data signal and hence will correspond to the bit period of the digital data signal.

The comparator circuit 31 of this embodiment receives the digital data signal from the input IN at the input of inverter IN11 and at a first input of the NAND gate ND2. The output of inverter IN11 is connected with the input of inverter IN10 the output of which is connected with the input of inverter IN9 the output of which is connected with the input of inverter IN8 the output of which is connected to one input of the NAND gate ND1. The other input of the NAND gate ND1 is connected with the output of inverter of inverter IN11. The second input of the NAND gate ND2 is connected with the output of inverter IN9. The output of NAND gate ND1 is connected with a first input of NOR gate NR1. The output of NAND gate ND2 is connected with a first input of the NOR gate NR2. The output of the delay circuit 12 is connected to an input of inverter IN5. The output of that inverter is connected to a second input of the NOR gate NR2 and to an input of an inverter IN6. The output of inverter IN6 is connected to a second input of the NOR gate NR1. The output of NOR gate NR1 is connected to a first input of NOR gate NR3. The output of NOR gate NR2 is connected to a second input of NOR gate NR3. The output of NOR gate NR3 provides a control signal CH that indicates the timing relationship between the specified signal pattern at the input IN of the delay circuit 1 and the delayed version of the signal pattern at the output CIN of the delay circuit 1. This control signal CH is connected to an input of the delay adjustment signal generating circuit 32.

The delay adjustment signal generating circuit 32 of this embodiment is a charge pump and in this example it comprises a p-channel MOSFET transistor MP1 the source of which is connected to an upper power supply potential VCC. The gate of that transistor receives the control signal CH. The drain of transistor MP1 is connected to the drain of an n-channel MOSFET transistor MN1. Gate and drain of that transistor are connected together and to a terminal of a capacitor C1. The source of transistor MN1 and the other terminal of capacitor C1 are connected to ground potential GND. The drain of transistor MN1 provides an analogue control signal CT for adjusting the delay of the delay circuits 11 and 12. Identical characteristics of the circuits 11 and 12 can be obtained by means of manufacturing both circuits on the same chip at the same time with the same process, as is well known as such. In this way, the delay of signal DIN will be half the delay of the signal CIN and bit rate adaptive half bit pre-distortion can be obtained.

Figure 5A:
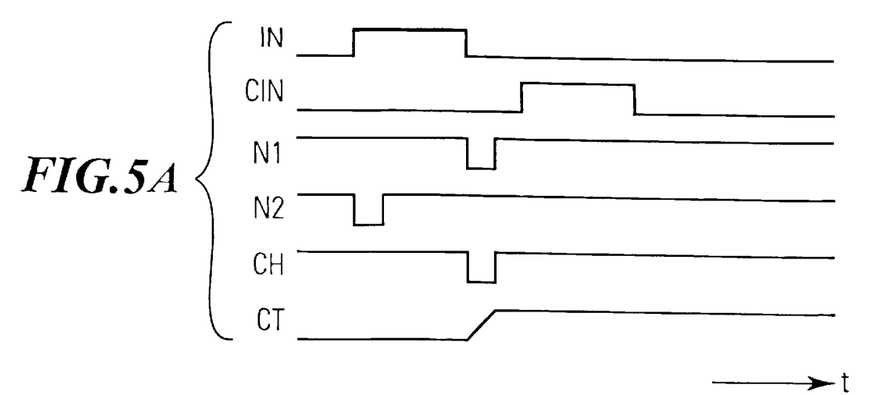
FIG. 5A and FIG. 5B show waveform diagrams for illustrating the operation of the embodiment of the adaptive delay circuit of FIG. 4.
Figure 5B:
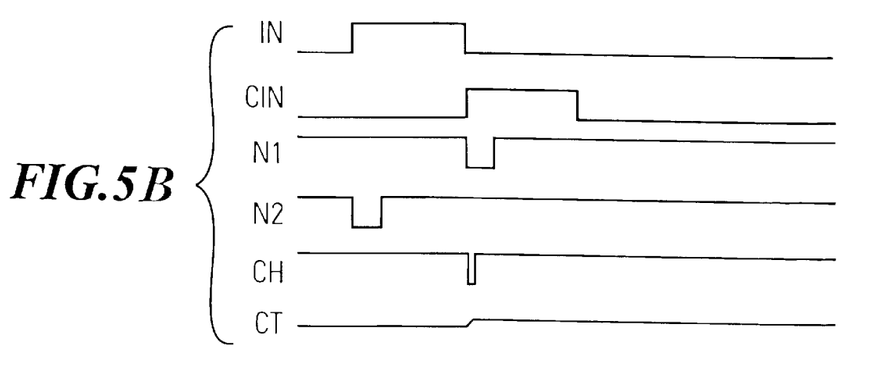

FIG. 5A and FIG. 5B show waveform diagrams for illustrating the operation of the circuit of FIG. 4 in more detail.

FIG. 5A comprises a first group A and FIG. 5B comprises a second group B of waveforms for illustrating the operation of the embodiment of FIG. 4. The first group A of waveforms illustrates the case that a pulse of a duration shorter than the current delay generated by the delay circuits 11 and 12 occurs in the digital data signal at the input IN of the adjustable delay circuit 4. As is evident from the waveforms IN and CIN of group A in FIG. 5A, the pulse at the input IN ends earlier than the delayed version of this pulse at the output CIN begins. This situation causes the comparator circuit 31 and the circuit 32 for generating a delay adjusting signal CT to reduce the delay of the signal CIN to close the gap between the falling edge of the pulse at IN and the rising edge of the pulse at CIN. To this end, in response to the falling edge of the signal IN a pulse appears at the output of NAND gate ND1, the maximum duration of this pulse being determined by the propagation delay of the input signal IN through the inverters 1N8, 1N9 and IN10. Whenever this pulse N1 is generated and the delayed pulse at CIN has not yet begun, NOR gate NR1 generates a pulse at its output that passes through NOR gate NR3 and appears as the control signal CH at the output of comparator circuit 31. This control signal CH switches on the p-channel MOSFET MP1 such that the voltage across capacitor C1 will increase corresponding to the duration of the pulse CH. The voltage across the capacitor C1 at the drain of transistor MN1 constitutes the control signal CT. In response to the pulse at the gate of transistor MP1, the level of the signal CT increases by an amount corresponding to the duration of the pulse at CH such that the delay provided by circuits 11 and 12 is reduced accordingly. In this way, whenever the specified signal pattern, in this case a simple pulse, occurs at the input IN and the signal pattern is shorter than the currently adjusted delay provided by circuits 11 and 12, this delay will be reduced until a state is reached that is depicted in group B of waveforms in FIG. 5B. At this stage, the end of the pulse at the input IN approximately coincides with the beginning of the delayed pulse at CIN such that the control signal CH at the output of NOR gate NR3 almost disappears. Accordingly, no further adjustment towards shorter delay times of the delay circuits 11 and 12 takes place. If the pulse at the input IN of group B was a pulse of minimum duration in the digital data signal at the input IN, no further reduction of the delay provided by the chain of delay circuits 11 and will take place, and the total delay provided by the circuits 11 and 12 is adjusted to the minimum duration of signal segments that can occur in the digital data signal. If a pulse of a duration larger than the current delay at CIN appears in the digital data signal, there will be an overlap between the pulse at the input IN and the pulse at the output CIN of the delay circuit. During such overlap the NOR gate NR1 will output a signal at high level such that there will be no pulse at the output CH of the comparator circuit 31. From this it is evident that signal patterns of a duration longer than the minimum duration will not affect the process of adjusting the delay of the signal CIN to a value corresponding to the minimum duration of the specified signal pattern which in this exemplary embodiment is a simple pulse.

The NAND gate ND2 and the NOR gate NR2 are provided in the embodiment of FIG. 4 for processing pulses of negative amplitude while the NAND gate ND1 and the NOR gate NR1 are provided for processing pulses of positive amplitude, as just described. N2 in FIG. 5 shows a pulse of a predetermined duration at the output of NAND gate ND2 which occurs in response to a rising edge at the input IN. The duration of this pulse is determined by the propagation delay of the signal through the inverters IN9, IN10 and IN11. NOR gate NR 2 acts to generate an output pulse to NOR gate NR3 with a duration corresponding to the gap on the time axis between the end of the negative pulse at the input IN and the beginning of the delayed negative pulse at the output CIN of delay circuit 12. The maximum duration of this pulse is determined by the propagation delay through the inverters IN9 to IN11. Whenever NOR gate NR2 generates a pulse at its output, this pulse is inverted and forwarded by NOR gate NR3 to the gate of transistor MP1 to increase the voltage across capacitor C1 and thus decrease the delay of the delay circuit 1. Due to the provision of the gates ND1 and NR1 and furthermore the gates ND2 and NR2, the comparator circuit 31 of this embodiment can detect the time relationship between the undelayed version and the delayed version of two different signal patterns, namely for a positive pulse and for a negative pulse, in order be able to quickly adapt to the bit rate even if one signal pattern of minimum duration is significantly less frequent than the other signal pattern of minimum duration. From a principle point of view it would of course be sufficient if the comparator circuit 31 only comprises circuitry, in this example the gates ND1 and NR1, for detecting the timing relationship for positive pulses or only comprises circuitry, in this example the gates ND2 and NR2, for detecting the timing relationship among negative pulses, in place of the gates ND1, ND2, NR1, NR2 and NR3.

Transistor MN1 serves to gradually discharge the capacitor C1 such that a continuous gradual increase in the delay provided by delay circuits 11 and 12 is achieved. Whenever a signal pattern of minimum duration occurs at the input IN, this gradual increase of the delay is re-adjusted such that the delay of signal CIN substantially remains at the minimum duration of the signal patterns processed by the comparator circuit 31. Due to the provision of transistor MN1 the adaptive delay circuit 4 is at the same time able to adapt itself to increasing minimum signal durations.

It is advantageous to make the rate at which the delay of the delay circuit 1 gradually increases, dependent on the current bit rate. A measure for the current bit rate is the delay to which the delay circuit 1 is currently adjusted. By means of making the rate of increase of the delay time of the delay circuit 1 dependent on the currently adjusted delay, the circuit can quickly adjust itself to varying data rates. Specifically, the shorter this delay the higher is preferably the rate of the gradual increase of the delay because if the bit rate is high and the delay is short, the frequency of occurrence of the specified signal pattern with minimum duration can be expected to be higher than if the bit rate is low and the delay is longer. In the embodiment of FIG. 4 this dependency of the rate of increase of the delay on the actual delay is achieved by means of transistor MN1. The higher the gate voltage, the lower is the drain source resistance of that transistor such that for high levels of the control signal CT corresponding to short delays, the gradual increase of the delay is larger than for longer delays corresponding to a lower level of the control signal CT.

Figure 6:
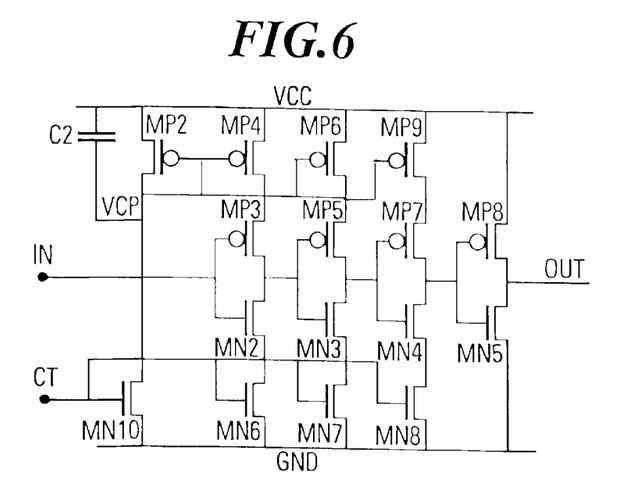
FIG. 6 shows an embodiment of an adjustable delay circuit.

FIG. 6 shows an embodiment of an adjustable delay circuit. This adjustable delay circuit has an input IN for receiving a digital data signal to be delayed, and an output OUT for outputting the delayed digital data signal. It furthermore has a control signal input for receiving a control signal CT that allows the delay of the signals at the output OUT relative to the signal at the input IN to be adjusted. The delay circuit of FIG. 6 comprises a series connection of inverters and exploits the fact that the delay that a signal experiences when passing through each inverter, depends on the maximum current that the respective inverter is allowed to draw from its power supply when its output changes its state.

Specifically, in the embodiment of FIG. 6 the reference numerals MP2 to MP9 denote p-channel MOS transistors while the reference numerals MN2 to MN8 and MN10 denote n-channel MOS transistors. The transistors MP3 and MN2 are connected to constitute a first CMOS inverter. A second and a third CMOS inverter is constituted by transistors MP5, MN3 and transistors MP7, MN4, respectively. Transistors MP8 and MN5 constitute a further CMOS inverter that acts as a buffer between the output of the third CMOS inverter and the output OUT of the delay circuit. The gates of the two transistors of each CMOS inverter are connected together to constitute the respective input of the inverter whereas the drains of the two transistors of each CMOS inverter are connected together to constitute the output of the respective inverter. The input of the first inverter constitutes the input IN of the delay circuit. The output of the first inverter is connected to the input of the second inverter the output of which is connected to the input of the third inverter the output of which is connected to the input of the buffer inverter the output of which constitutes the output OUT of the delay circuit.

The first CMOS inverter has the source of the PMOS transistor MP3 connected to the drain of a PMOS transistor MP4 the source of which is connected to the positive power supply potential VCC. The source of transistor MN2 of the first CMOS inverter is connected to the drain of transistor MN6 the source of which is connected to ground potential GND. The source of transistor MP5 of the second CMOS inverter is connected to the drain of transistor MP6 the source of which is connected to VCC. The source of transistor MN3 is connected to the drain of transistor MN7 the source of which is connected to GND. Similarly, the source of transistor MP7 of the third CMOS inverter is connected to the drain of transistor MP9 the source of which is connected to VCC. The source of transistor MN4 is connected to the drain of transistor MN8 the source of which is connected to GND. The source of transistor MP2 is connected to VCC. The drain of that transistor is connected to the gate of transistor MP2 as well as to the gates of transistors MP4, MP6 and MP9. The drain of transistor MP2 is furthermore connected to the drain of transistor MN10. The source of transistor MN10 is connected to ground. The gates of the transistors MN10, MN6, MN7 and MN8 are connected together and constitute the input for the delay adjustment signal CT. A capacitor C2 is connected across the drain source path of transistor MP2. The source of transistor MP8 is directly connected to VCC while the source of transistor MN5 is directly connected to ground. In operation, the level of the control signal CT at the input of the delay circuit determines the drain source current through transistor MN10 and similarly the drain source current of transistors MN6, MN7 and MN8. The drain source current through current MN10 is furthermore substantially identical with the drain source current of transistor MP2. The transistors MP4, MP6 and MP9 respectively constitute current mirrors with the transistor MP2 such that the drain source currents through the transistors MN10, MN6, MN7, MN8 and MP2, MP4, MP6 and MP9 are essentially the same and dependent on the signal level at the control input CT of the delay circuit. The higher the control signal level at the input CT, the larger is the maximum current that is available for each of the first to third inverters when changing state and the lower is the delay caused by each of these inverters. Vice versa, for a low signal level at the control input CT at the delay circuit, the maximum current available for each of the first to third inverters is lower such that a change of state at the output of each of the three inverters requires more time, this resulting in an increased overall delay between the output OUT and the input IN of the circuit shown in FIG. 6. The smoothing capacitor C2 is optional.

Figure 7:
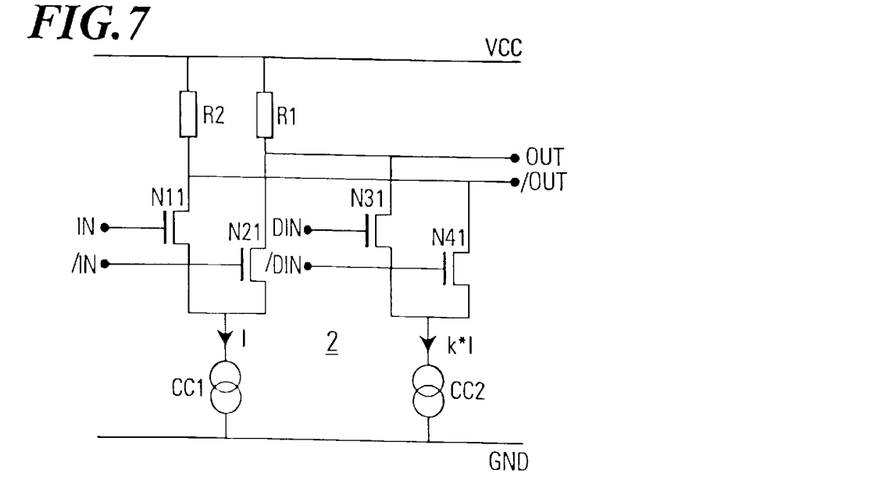
FIG. 7 shows an embodiment of a combiner circuit.

FIG. 7 shows an embodiment of the combiner circuit 2 for combining the digital data signal with a delayed version of the digital data signal to obtain a pre-distortion of the digital data signal. The combiner circuit according to the embodiment of FIG. 7 comprises a first differential amplifier stage having transistors N11 and N21 the sources of which are connected together and with a first terminal of a current source CC1. The other terminal of the current source CC1 is connected to ground. The drain of transistor N11 is connected to the power supply potential VCC via a resistor R2. A further resistor R1 connects the drain of transistor N21 to the power supply potential VCC. The combiner circuit comprises a second differential amplifier stage having transistors N31 and N41 the sources of which are connected together and to a first terminal of a current source CC2. The second terminal of that current source is connected to ground. The drain of transistor N31 is connected to the drain of transistor N21 such that the current through resistor R1 is divided among the transistors N21 and N31. The drain of transistor N41 is connected to the drain of transistor N11 such that the current through resistor R2 is divided among transistor N41 and N11. The gates of transistors N11 and N21 constitute a first differential input IN, /IN while the gates of the transistors N31 and N41 constitute a second differential input DIN, /DIN. The resistors R1 and R2 preferably have the same resistance. The current source CC1 provides a constant current I while the current source CC2 provides a constant current k·I with 0<k<1. The terminal of resistor R1 which is connected to the drain of transistor N21 and the drain of transistor N31 constitutes an output terminal OUT of the combiner circuit 2 while the terminal of resistor R2 connected to the drain of transistor N11 and to the drain of transistor N41 constitutes an inverted output terminal /OUT of the combiner circuit 2.

In operation, the combiner circuit 2 outputs a differential signal at the output terminals OUT and /OUT that corresponds to the signal amplitude across the differential inputs IN and /IN minus k times the amplitude across the other differential input DIN and /DIN. In this way, the combiner circuit combines the amplitudes of the respective signals at its two differential inputs IN, /IN and DIN, /DIN into a differential output signal OUT, /OUT, the signal at the differential input DIN, /DIN being weighted by the weight factor k. The signal /IN can be obtained from the signal IN by means of using a well-known inverter. The same applies for the generation of the signal /DIN from the signal DIN.

Figure 8A:
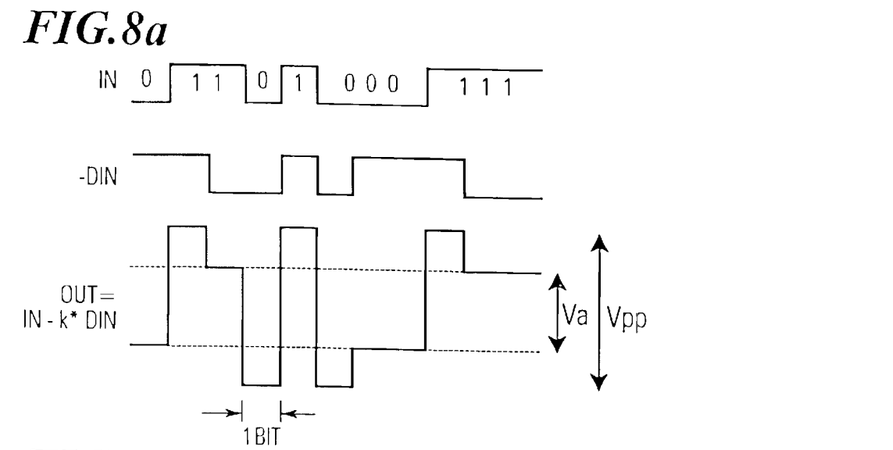
FIGS. 8a and 8b show waveform diagrams for illustrating digital data signals provided with pre-distortion.

FIG. 8a shows an embodiment of an output signal OUT with full bit pre-distortion that is obtained when combining a digital data signal IN with a delayed version DIN of the digital data signal that has a delay of a full bit period. The combiner circuit combines the signal amplitudes of the two signals IN and DIN into an output signal OUT=IN−k·DIN. The weight factor k determines the amount of pre-distortion in the output signal OUT and hence the ratio between Vpp, that is the peak-to-peak signal amplitude of the pre-distorted output signal, to the signal amplitude Va which is the signal amplitude without pre-distortion.

Figure 8B:
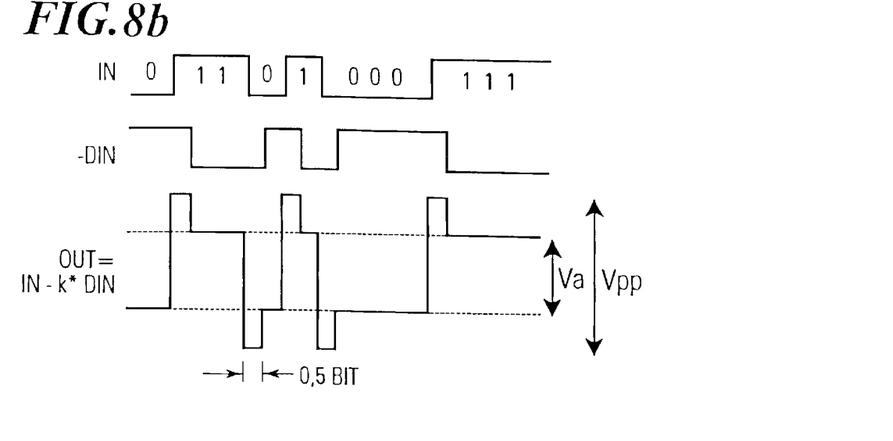

FIG. 8b shows an example of an output signal OUT with half bit pre-distortion. This signal is obtained when combining a digital data signal IN with a delayed version of the digital data signal, the delay being half a bit period of the digital data signal.

Half bit or part bit pre-distortion is advantageous in that the timing distortion at the output of the lossy transmission media is less in comparison with full bit pre-distortion when the damping of the transmission media is low and the pre-distortion peaking, i.e. k, is high. Accordingly, half bit or part bit pre-distortion is preferable when there is a large variety of different transmission lengths. When using part bit pre-distortion, the peaking factor k can be set to a fixed value or can be made selectable among a small number of different values in order to achieve that for all applications the timing distortion is very low. Setting the peaking value k not higher than necessary helps to save power and reduce electromagnetic interference. While partial bit pre-distortion has been described above in connection with the adaptive delay circuit 4 it is evident that the advantages of partial bit pre-distortion can be obtained without the adaptive delay circuit 4 and the detection circuit 3.

While the previous embodiments have addressed pre-distortion of first order, it is evident that the same principles can be extended to achieve a pre-distortion of higher orders.

Figure 9:
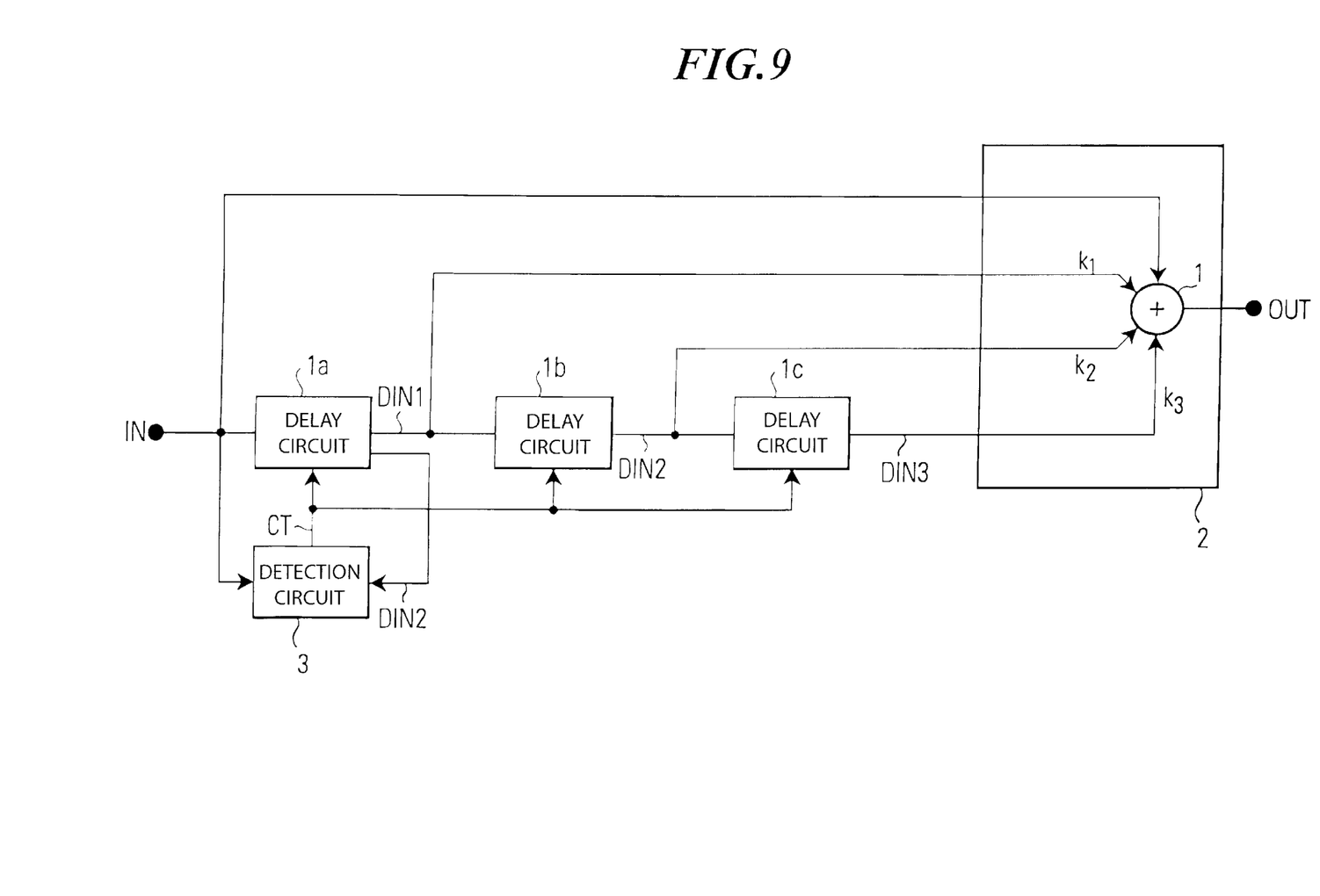
FIG. 9 shows an embodiment of a circuit for providing a digital data signal with higher order pre-distortion according to the present invention.

FIG. 9 shows an embodiment of a circuit for providing a digital signal with pre-distortion of third order. All elements in this figure that correspond to elements already described with reference to any of the preceding figures, are given the same reference numerals. Specifically, reference numerals 1a, 1b and 1c denote a chain of adjustable delay circuits for generating delayed versions DIN1, DIN2 and DIN3 with different delays of the input signal IN. The output DIN1 provides a delay of half a bit period, as described in connection with the embodiments of FIGS. 3 and 4 while the output signal DIN2 of delay circuit 1b is further delayed relative to the signal DIN1. Similarly, delay circuit 1c provides further delay in the signal DIN3 relative to the signal DIN2. The internal structure of delay circuit 1a as well as the internal structure of the detection circuit 3 can be as described in connection with FIGS. 3 and 4. Delay circuits 1b and 1c can have an internal structure the principle of which is shown in FIG. 6.

The combining circuit 2 of the embodiment shown in FIG. 9 combines the signal amplitudes of the digital data signal at the input IN with the delayed versions DIN1, DIN2 and DIN3 using different weight factors k1, k2 and k3. The internal structure of the combining circuit 2 can be essentially as described in connection with FIG. 7, including additional differential amplifier circuits connected to the differential output bus OUT, /OUT of FIG. 7, the association of the respective transistors to the respective one of the output lines OUT or /OUT being selected depending on whether an addition or a subtraction of the respective delayed component is desired, and the associated constant current source generating a current in accordance with the absolute value of the respective weighting factor.

The embodiments of the FIGS. 4 to 9 are based on the detection of a signal pattern indicative of a minimum signal segment duration which signal pattern is a single signal segment or pulse. There exist, however, numerous other possibilities for selecting a signal pattern that is indicative of a minimum signal segment duration in the digital data signal. Another example for such signal pattern is a sequence of a pre-determined number of signal segments with alternating signal level. Also such pattern of minimum duration is indicative of the minimum signal segment duration in the digital data signal. It can be detected by a detection circuit 3 in accordance with FIGS. 1 or 3 by means of connecting a frequency divider between the input IN for the digital data signal and the detection circuit 3 and in case of FIG. 3, furthermore connecting a similar frequency divider between the output CIN of the delay circuit 1 and the input of the comparator circuit 31 for the delayed signal. The frequency division ratio of these frequency dividers determines the number of signal segments included in the signal pattern that is subject to detection in the circuit 3. This solution is advantageous in that for signals at high data rate it lowers the speed requirements for the detection circuit 3. On the other hand, since the frequency of occurrence of a signal pattern that is indicative of the minimum signal segment duration in the digital data signal decreases with the complexity of the signal pattern, there are less opportunities per time unit for the detection circuit 3 and at the delay circuit 1 to adapt the delay to the actual bit rate of the digital data signal. While in the embodiment of FIG. 4 the adjustable delay circuit 1 with the sub circuits 11 and 12 provides both the signal CIN for the detector circuit 3 and the delayed signal DIN for combining with the digital data signal IN, it is of course possible to have a separate delay circuit as a part of the detection circuit 3 for providing the delayed signal CIN, and an additional delay circuit in parallel for providing the delayed digital signal DIN. In this case both of them can be controlled by the same delay adjustment signal CT.

What is claimed is:

1. A circuit for providing a digital data signal with pre-distortion for transmission over a medium having frequency dependent transmission characteristics, said digital data signal being composed of a sequence of signal segments, each segment having a constant signal level in accordance with the information to be carried by said digital data signal, said circuit comprising an adjustable delay circuit for delaying said digital data signal by a time delay adjustable in accordance with a delay adjustment signal;

a combining circuit for combining the amplitude of said digital data signal and the amplitude of said delayed digital data signal into a pre-distorted digital output signal for transmission over said transmission media; and a detection circuit for detecting a duration of a repetitively occurring signal pattern indicative of a minimum signal segment duration in said digital data signal;

said delay circuit for delaying said digital data signal being connected to adjust said time delay depending on said detected signal pattern duration.

2. The circuit according to claim 1, wherein said signal pattern is a symbol representing a single data bit in said digital data signal.

3. The circuit according to claim 1, wherein said signal pattern is a signal segment of a symbol representing a single data bit or a plurality of data bits in said digital input signal.

4. The circuit according to claim 1, wherein said signal pattern is a symbol representing a predetermined sequence of data bits in said digital input signal.

5. The circuit according to claim 1, wherein said detection circuit comprises a comparator circuit for detecting a timing relationship between said signal pattern in said digital input signal and said signal pattern at an output of said adjustable delay circuit; and a circuit for generating the delay adjusting signal in accordance with said detected timing relationship.

6. The circuit according to claim 5, wherein said circuit for generating the delay adjustment signal is adapted to generate said delay adjustment signal such that the delay adjusted in said adjustable delay circuit coincides or at least approximately coincides with the duration of said signal pattern indicative of a minimum signal segment duration.

7. The circuit according to claim 5, wherein said circuit for generating the delay adjustment signal is adapted to generate said delay adjustment signal such that the beginning of said delayed signal pattern at the output of said adjustable delay circuit coincides or at least approximately coincides with the end of the non-delayed signal pattern in said digital input signal.

8. The circuit according to claim 5, wherein said circuit for generating the delay adjustment signal is adapted to decrease the current delay of said delay circuit if the detected duration of said signal pattern is shorter than the current delay time, and to maintain the current delay of said delay circuit if the detected duration of said signal pattern is longer than the current delay time.

9. The circuit according to claim 5, further comprising:
a circuit for gradually changing the delay adjustment signal in order to gradually increase the delay time of said adjustable delay circuit.

10. The circuit according to claim 9, wherein
said circuit for gradually changing saicl delay adjustment signal is adapted to change said delay adjustment signal at a rate that depends on the frequency of occurrence of said signal pattern.

11. The circuit according to 9, wherein
said circuit for gradually changing said delay adjustment signal is adapted to change said delay adjustment signal at a rate that depends on the duration of said repetitively occurring signal pattern indicative of a minimum signal segment duration in said digital data signal or on the delay time currently adjusted in the delay circuit.

12. The circuit according to claim 1, further comprising:
a digital counter for frequency dividing said digital input signal by a predetermined frequency division ratio;
said detection circuit being connected to detect the duration of a repetitively occurring signal pattern indicative of the minimum signal segment duration in said frequency divided digital data signal.

13. The circuit according to claim 1, wherein said combining circuit is connected to receive said delayed digital data signal from said adjustable delay circuit.

14. The circuit according to claim 1, wherein
said adjustable delay circuit comprises a chain of adjustable delay sub circuits and is connected to receive at its input said digital data signal and has taps for outputting said digital data signal at different delays; and
said combining circuit is connected to combine the amplitudes of at least two of said digital data signal and said digital data signal with different delays at the taps of said chain of delay sub circuits into said digital pre-distorted output signal for transmission over said transmission media.

15. The circuit according to claim 1, further comprising:
an additional adjustable delay circuit for delaying said digital data signal in proportion to the delay adjusted in said adjustable delay circuit;
said combining circuit being connected to combine said digital data signal and said delayed digital data signal output by said additional adjustable delay circuit into said digital output signal.

16. The circuit according to claim 1, characterized in that wherein
said delay circuit is adapted to delay said digital data signal by a predetermined fraction of said detected signal pattern duration.

17. A transmission line driver circuit for transmitting digital data signals over a transmission line, comprising a circuit according to claim 1.

18. A method of providing a digital data signal with pre-distortion for transmission over a medium having frequency dependent transmission characteristics, said digital data signal being composed of a sequence of signal segments, each segment having a constant signal level in accordance with the information to be carried, said method comprising
providing said digital data signal;
delaying said digital data signal by a time delay adjustable in accordance with a delay adjustment signal;
combining the amplitude of said digital data signal and the amplitude of said delayed digital data signal into a pre-distorted digital output signal for transmission over said transmission media; and
detecting the duration of a repetitively occurring signal pattern indicative of a minimum signal segment duration in said digital data signal;
said time delay of said digital data signal being adjusted depending on said detected signal pattern duration.

* * * * *